US010915173B2

(12) United States Patent
Holbery

(10) Patent No.: US 10,915,173 B2
(45) Date of Patent: *Feb. 9, 2021

(54) HAPTIC FEEDBACK SYSTEM

(71) Applicant: Microsoft Technology Licensing, LLC, Redmond, WA (US)

(72) Inventor: James David Holbery, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/786,140

(22) Filed: Feb. 10, 2020

(65) Prior Publication Data

US 2020/0174569 A1  Jun. 4, 2020

Related U.S. Application Data

(63) Continuation of application No. 15/640,341, filed on Jun. 30, 2017, now Pat. No. 10,572,011.

(51) Int. Cl.
| | |
|---|---|
| *G06F 3/01* | (2006.01) |
| *A63F 13/24* | (2014.01) |
| *A63F 13/285* | (2014.01) |
| *G06F 1/16* | (2006.01) |
| *G06T 19/00* | (2011.01) |

(52) U.S. Cl.
CPC ............. *G06F 3/014* (2013.01); *A63F 13/24* (2014.09); *A63F 13/285* (2014.09); *G06F 1/163* (2013.01); *G06F 3/016* (2013.01); *A63F 2300/8082* (2013.01); *G06T 19/006* (2013.01)

(58) Field of Classification Search
CPC .......... G06F 3/014; G06F 1/163; G06F 3/016; A63F 13/24; A63F 13/285; A63F 2300/8082; G06T 19/006
USPC ....................................................... 715/701
See application file for complete search history.

(56) References Cited

U.S. PATENT DOCUMENTS

| | | | | |
|---|---|---|---|---|
| 9,804,677 | B2* | 10/2017 | Kim | G06F 3/011 |
| 9,963,597 | B2* | 5/2018 | Aizenberg | B08B 17/065 |
| 9,971,408 | B2* | 5/2018 | Gustin | G06F 3/016 |
| 10,071,187 | B2* | 9/2018 | Hiles | C12M 23/34 |
| 2009/0266421 | A1* | 10/2009 | Linder | B01L 3/502784 137/1 |
| 2012/0182135 | A1* | 7/2012 | Kusuura | G06F 3/00 340/407.1 |

(Continued)

*Primary Examiner* — Scott T Baderman
*Assistant Examiner* — Hassan Mrabi
(74) *Attorney, Agent, or Firm* — Alleman Hall Creasman & Tuttle LLP

(57) ABSTRACT

Examples are disclosed that relate to providing haptic feedback. One example provides a haptic feedback system comprising a wearable device configured to be worn by a user, the wearable device including a fluidic channel, a fluid disposed within the fluidic channel, the fluid including an adjustable viscosity, a circuit configured to vary a field within the fluidic channel, and a controller. The controller is configured to receive a first input, and in response to receiving the first input, apply a first field within the channel via the circuit to set the adjustable viscosity of the fluid to a first viscosity, and receive a second input, and in response to receiving the second input, apply a second field within the channel via the circuit to set the adjustable viscosity of the fluid to a second viscosity.

20 Claims, 8 Drawing Sheets

(56) References Cited

U.S. PATENT DOCUMENTS

2014/0328999 A1* 11/2014 Aizenberg ................ A61F 2/28
                                                    427/2.26
2016/0139666 A1*  5/2016 Rubin ...................... G09B 9/00
                                                    345/633
2016/0263577 A1*  9/2016 Ismagilov ......... B01L 3/502738
2017/0228019 A1*  8/2017 Kim ........................ G06F 3/011

* cited by examiner

HAPTIC FEEDBACK SYSTEM

CROSS REFERENCE TO RELATED APPLICATIONS

This application is a continuation of U.S. patent application Ser. No. 15/640,341, filed Jun. 30, 2017, the entirety of which is hereby incorporated herein by reference for all purposes.

BACKGROUND

Various devices may be utilized to provide haptic feedback for a computing device. For example, a wearable device may provide haptic feedback in the form of vibration when worn or carried by a user.

SUMMARY

One example provides a haptic feedback system comprising a wearable device configured to be worn by a user, the wearable device including a fluidic channel and a fluid disposed within the fluidic channel, the fluid including an adjustable viscosity. The system further comprises a circuit configured to vary a field within the fluidic channel, and a controller. The controller is configured to receive a first input, in response to receiving the first input, apply a first field within the channel via the circuit to set the adjustable viscosity of the fluid to a first viscosity, receive a second input, and in response to receiving the second input, apply a second field within the channel via the circuit to set the adjustable viscosity of the fluid to a second viscosity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

While mixed reality and virtual reality systems may provide an immersive visual and auditory experience, such systems may not provide a satisfying tactile experience for the user, in which virtual objects feel like the real objects they represent. Thus, examples are disclosed that relate to haptic feedback systems that may be used for tactile feedback in mixed reality and virtual reality settings.

Figure 1:
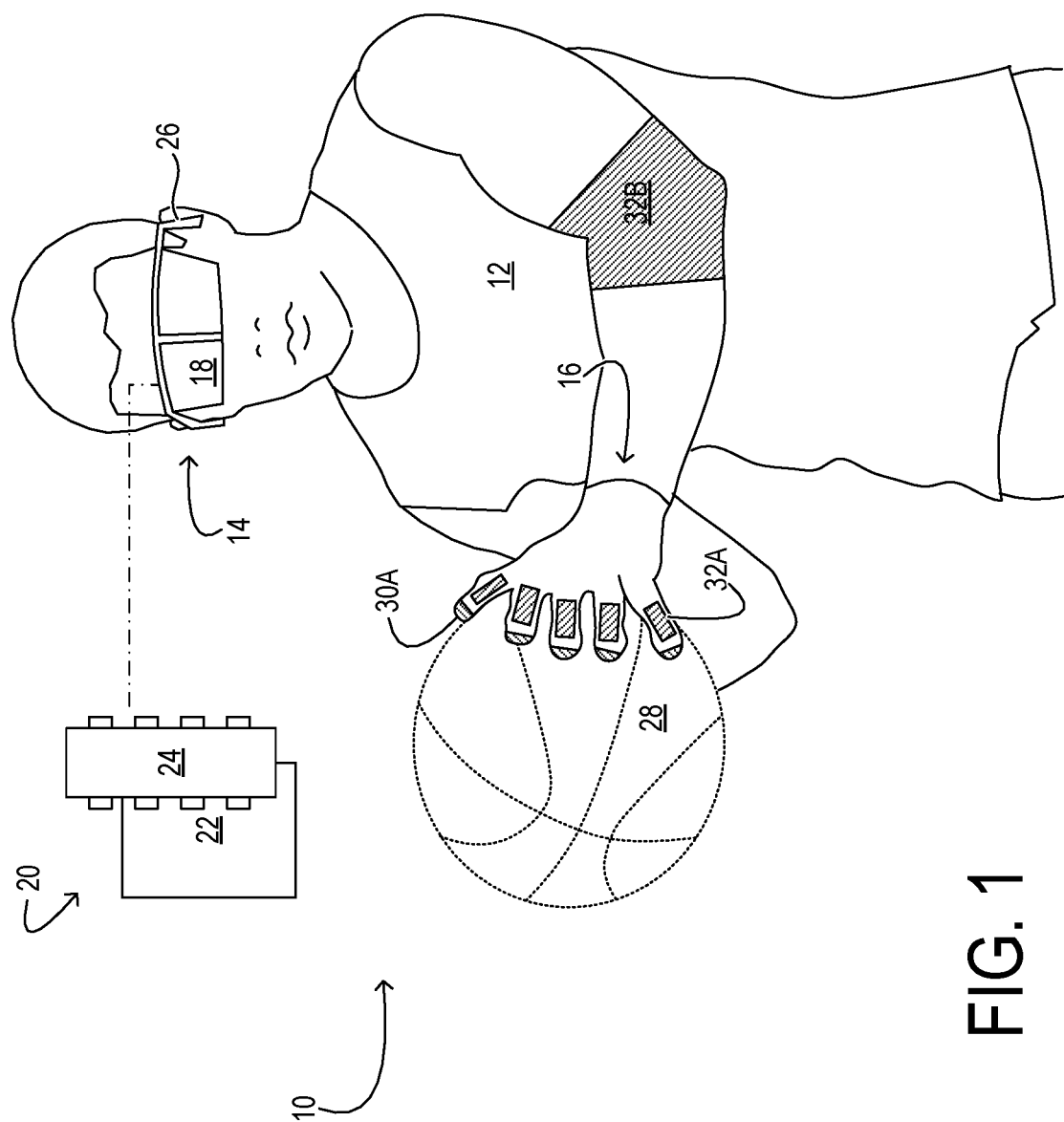
FIG. 1 shows aspects of an example display system including a haptic feedback system.

FIG. 1 shows aspects of an example display system 10 configured to present to a user 12 an immersive virtual reality environment. The display system 10 as illustrated is used to support virtual reality gameplay, but may be used in numerous other scenarios as well. Display system 10 includes a head-mounted display (HMD) device 14 and a haptic feedback system 16. HMD device 14 includes a display 18 configured to display virtual imagery in the field of view of the user. In some examples, display 18 is see-through, enabling real-world and virtual imagery to be admixed in the user's field of view. This approach may be referred to as augmented or mixed reality. In HMD device 14, signals encoding the virtual display imagery is sent to display 18 via an on-board computing device 20. Computing device 20 includes at least one processor 22 and associated memory 24, examples of which are described below with reference to FIG. 8.

Leveraging communications componentry arranged in HMD device 14, computing device 20 may be communicatively coupled to one or more off-board computing devices via a network. Thus, the virtual display imagery that user 12 sees may, in some examples, be composed and/or rendered by an off-board computing device. In other examples, the virtual display imagery may be composed and rendered on-board.

HMD device 14 includes loudspeakers 26 that enable user 12 to experience immersive VR audio. Haptic feedback system 16 of display system 10 is configured to further augment the immersive experience by providing lifelike tactile sensation responsive to user interaction with the virtual environment. In particular, system 16 may be configured to provide a mechanically resistive contact sensation in response to detection of contact between the body of the user and a virtual display object projected into a field of view of the user. For instance, the mechanical resistive contact sensation may be provided whenever the hand of user 12 intersects virtual display object 28.

Haptic feedback system 16 may optionally include a skin-pressure simulation portion 30A. The skin-pressure simulation portion is configured to apply touch-simulating pressure to the user's skin in the vicinity of contact with a virtual display object. The skin-pressure simulation portion may include an actuator configured to apply pressure in a direction normal to the surface of the skin. The skin-pressure simulation portion may include a piezoelectric or voice-coil type actuator, for example. In order to determine when to apply the pressure, the skin-pressure simulation portion is communicatively coupled to one or more computing devices of display system 10, such as on-board computer 20 of HMD device 14. More specifically, the computing device(s) host a model of the virtual environment and also track the position of the user's hand with the real-world coordinates of that model. When contact between the hand and a solid virtual object is indicated, the actuator is energized and pressure is applied to the skin. The actuator is de-energized when contact is no longer indicated. Accordingly, the skin-pressure simulation portion may be configured to give a static, rather than a dynamic actuation.

Although skin-pressure simulation portion 30A may simulate the sensation of the touch of a virtual object on the user's skin, this aspect alone may not provide a satisfactory contact sensation, as it would not offer a resistive effect of object contact on the user's skeletal joints. Contact with an actual solid object, by comparison, would result in the sensation of kinematic resistance to attempted movement through the object, which would be felt at the joints. For example, the joints of the fingers, in attempting to move the fingers through a solid object, would experience at least some reactive force from the object, with reference to Newton's third law.

To simulate this sensation, haptic feedback system 16 includes at least one body-movement restriction portion 32. In the example shown in FIG. 1, a first body-movement restriction portion 32A is arranged in a glove worn on the hand of user 12, and a second body-movement restriction portion 32B is arranged in a sleeve worn around the arm. A sleeve supporting a body-movement restriction portion may be worn alternatively or additionally on the leg or other body part. Body-movement restriction portion 32 may be used either with or without skin-pressure simulation portion 30 in various implementations.

Figure 2:
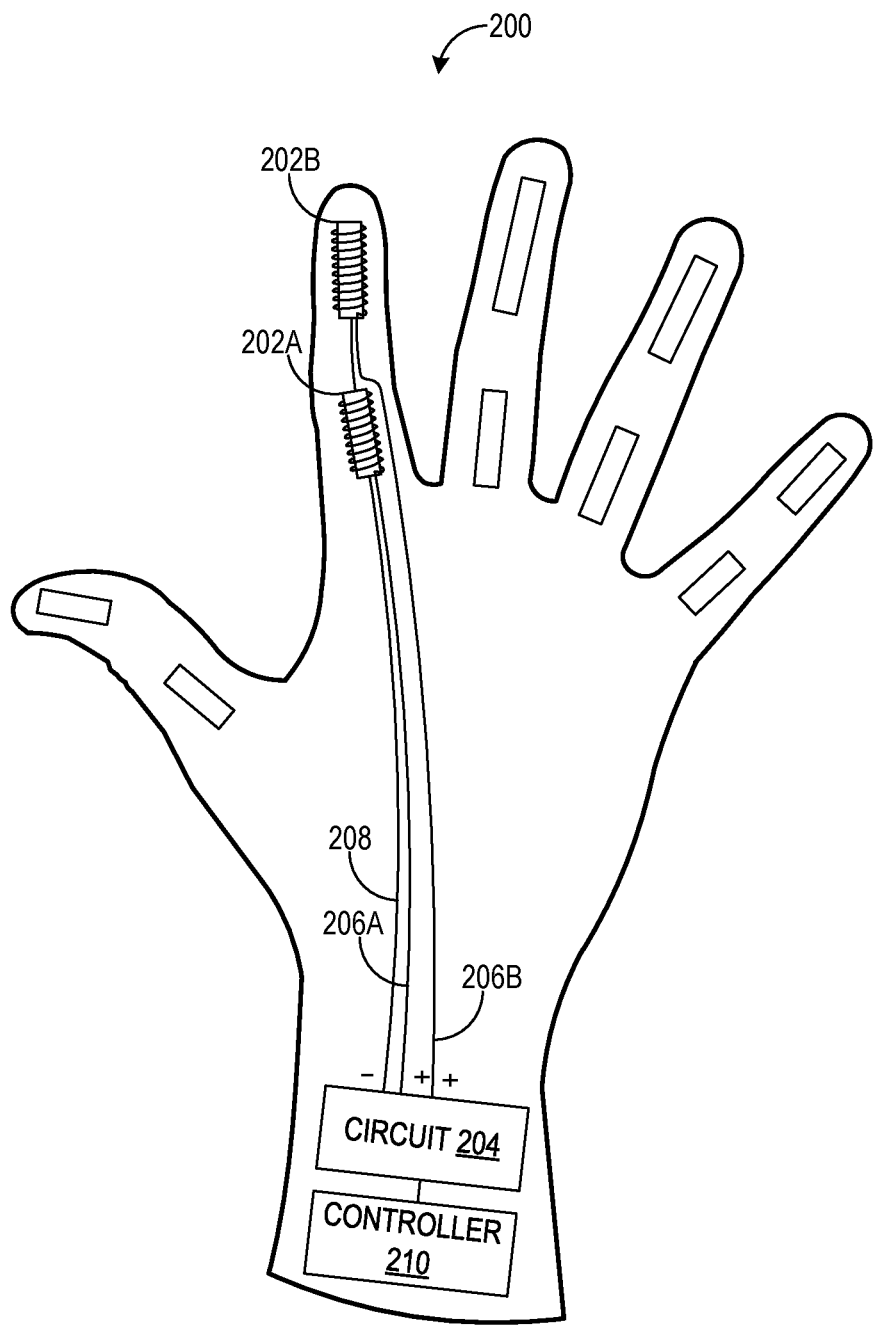
FIG. 2 shows an example wearable device in the form of a glove configured to provide haptic feedback.

FIG. 2 shows an example wearable device in the form of a glove 200 configured to provide mechanical resistance to hand movement in a manner that may be leveraged to simulate user interaction with a virtual display object as described above. Body-movement restriction portion 32A may be implemented in glove 200, for example. Glove 200 includes a plurality of fluidic channels such as fluidic channels 202A and 202B, in which an electrorheological fluid is disposed. The electrorheological fluid has an electrically adjustable viscosity that can be adjusted by varying an electric field applied to the fluid. By adjusting the fluid viscosity in fluidic channels 202A and 202B, which are shown as being arranged at an index finger portion of glove 200, a variable mechanical resistance to motion of an index finger may be provided. Similarly, fluidic channel(s) may be arranged at alternative or additional locations at glove 200 to provide variable mechanical resistance at such locations. As an example, FIG. 2 shows fluidic channels arranged at each digit portion to provide variable mechanical resistance for each digit of a user's hand. Any suitable arrangement and number of fluidic channels for any joints of the hand may be used. For example, instead of using separate channels at each knuckle of a digit, a channel may extend across multiple knuckles of a digit.

FIG. 2 also shows example circuitry 204 for varying an electric field applied to the fluid channels 202A, 202B via signal lines (+) 206A, 206B respectively for channels 202A and 202B and a common ground line (−) 208. Signal lines 206 comprise a conductive wire or other suitable conductor wound around fluidic channels 202, and ground line 208 comprises a conductor extending along each fluidic channel in a location relative to each signal line to create a desired electric field within each fluidic channel when the signal line is energized. By creating a voltage difference between signal lines 206A,B and ground line 208, electric field may be established between the signal and ground lines to vary the electrorheological fluid viscosity in the fluidic channels as described above. Signals may be applied separately to signal lines 206A and 206B to allow individual control of haptic feedback applied to different portions of a user's finger. In the depicted example, each fluidic channel is controlled by separate signal lines, while in other examples a same signal line may be used to control two or more channels. While shown only for fluidic channels 202A,B in FIG. 2 for clarity, it will be understood that other fluidic channels also include similar control circuitry. Also, in other examples, the signal lines may be printed onto a surface of the channels, or printed onto fabric or other substrate adjacent to the channels.

Figure 3A:
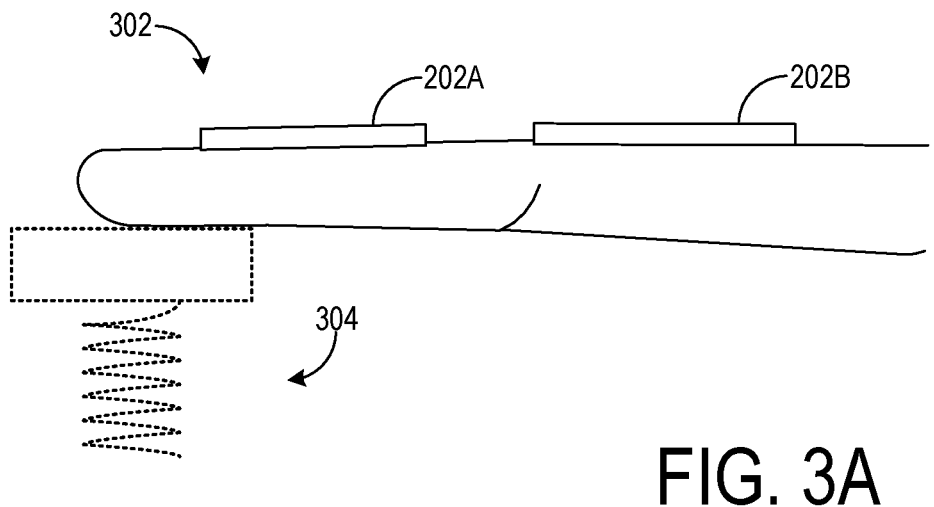
FIGS. 3A and 3B show respective states of a digit of the glove of FIG. 2.
Figure 3B:
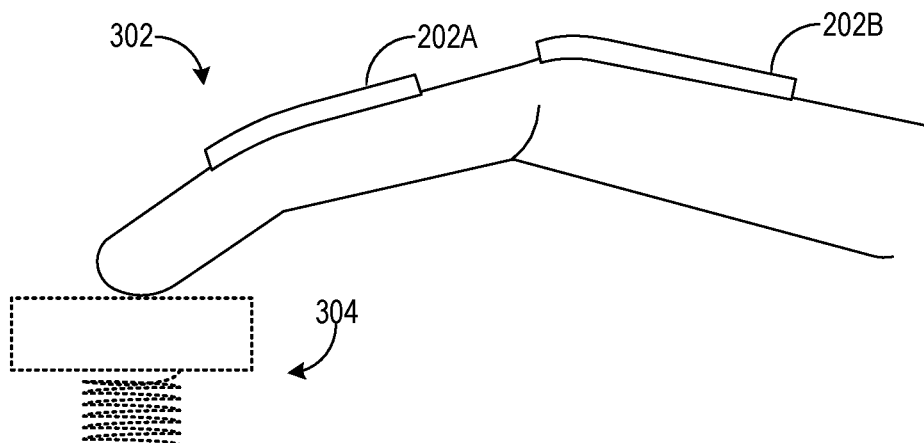

Glove 200 further comprises a controller 210 configured to control circuit 204 and thereby control the application of electric fields within fluidic channels 202 to adjust the viscosity of the electrorheological fluid in fluidic channels 202 and simulate the resistive sensation associated with joint articulation against a virtual display object. As an example, FIGS. 3A and 3B show respective states of a digit 302 of glove 200 in which different levels of mechanical resistance to digit motion are established by controller 210 to simulate virtual display object interaction. More specifically, FIG. 3A depicts a first state in which digit 302 is in a relatively straight and extended orientation, and is applying a relatively small virtual force to a virtual display object in the form of a spring 304. To simulate an opposing compression force by spring 304, controller 210 outputs a first signal to apply a first electric field to fluidic channels 202, setting the electrorheological fluid viscosity therein to a first viscosity that results in a corresponding first level of mechanical resistance to movement of digit 302 and perceived resistance to compression of the spring.

In a second state shown in FIG. 3B, digit 302 has assumed a relatively bent, angled orientation in an attempt to further compress spring 304. To simulate a relatively greater opposing compression force by spring 304 than that simulated in the first state shown in FIG. 3A, controller 210 outputs a second signal to apply a second electric field to fluidic channels 202, setting the electrorheological fluid viscosity therein to a second viscosity greater than the first viscosity. As a result, digit 302 experiences a second mechanical resistance greater than the first mechanical resistance to articulation against spring 304, simulating the increased opposing force as a result of the increased virtual compression of the spring. While two levels of mechanical resistance are described in this example, controller 210 may be configured to implement any suitable number of levels of mechanical resistance, which in some examples may include a continuously variable range of mechanical resistances (e.g., in correspondence with the continuously variable level of virtual compression of spring 304).

In some examples, controller 210 may determine the selection of fluidic channels 202 to which to apply electric fields, and potentially magnitudes of viscosity adjustments to be applied to each tube. In other examples, either or both of these determinations may take place at a host device communicatively coupled to controller 210, such as HMD device 14. In either case, different subsets of fluidic channels may be operated differently to provide disparate levels of mechanical resistance at different locations on glove 200.

In some examples, various kinematic properties of glove 200 may be tracked in varying the electric fields applied to fluidic channels 202—for example, the kinematic properties may be used to determine an electric field and/or to update electric field determination during application. To this end, output from one or more sensors may be utilized, which may be located on the glove and/or remotely from the glove, such as on HMD device 14. As examples, the sensor(s) may comprise an inertial measurement unit (IMU), an image sensor (e.g., visible light camera, infrared camera, depth camera), and/or a stress/strain sensor.

FIGS. 3A and 3B illustrate an example in which the placement of fluidic channels 202 enables the provision of variable mechanical resistance to digit articulation about the interphalangeal and metacarpophalangeal joints. Other placements that enable variable resistance against alternative or additional hand joints may be used, as well as placements that enable variable resistance against non-articulated motion. Further, while shown as being arranged at the dorsal side of glove 200, fluidic channels may be provided alternatively or additionally at the palm side of the glove. Similarly, circuit 204 and controller 210 may be arranged at a wrist portion of glove 200 as shown in FIG. 3A or 3B or at other locations on the glove.

The electrorheological fluid disposed in the fluidic channels of glove 200 may have any suitable composition. As examples, the electrorheological fluid may comprise a zeolite-based fluid and/or an oil such as a vegetable oil or a silicone oil. Further, the electrorheological fluid may include a plurality of conductive particles, for example in the form of filings of iron or other conductive element(s). This may allow the electrorheological fluid itself to act as a conductor in the electric field control circuitry. The electrorheological fluid may comprise any suitable viscosity range. Further, in some examples, the fluidic channels of glove 200 may comprise a magnetorheological fluid. In this case, circuit 204 may be configured to apply a variable magnetic field to the fluidic channels.

Figure 4:
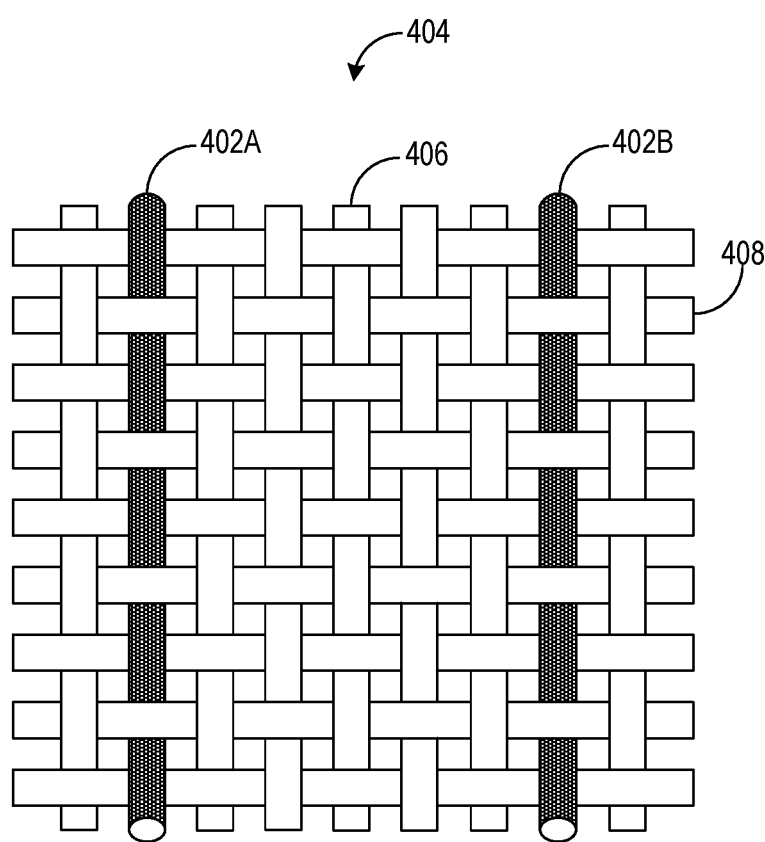
FIG. 4 show fluidic channels woven into a fabric layer of an example wearable device.

Fluidic channels may be integrated into the fabric of a wearable device in various manners. As one example, FIG. 4 shows fluidic channels 402A and 402B woven into a fabric layer 404 of a wearable device. Fabric layer 404 may represent a weave pattern that may be repeated to form a wearable device such as glove 200, for example.

In this example, fluidic channels 402 are woven into fabric layer 404 in a warp direction. The adjacent fluidic channels 402A and 402B are separated by a number of intervening warps (e.g., warp 406) of the fabric layer. The number of intervening warps may be selected to achieve desired handling characteristics of the wearable device (e.g., flexibility and firmness) and/or touch-and-feel characteristics, while preserving the ability to adjust the mechanical resistance to motion of the wearable device. In other examples, fluidic channels may be provided as adjacent warps without intervening fiber warps. The fluidic channel and fiber warps are woven with wefts (e.g., weft 408) to form the weave pattern of fabric layer 404. Any suitable fiber(s) may be selected for use as the warps and wefts woven with fluidic channels 402. As one example, a synthetic fiber such as spandex may be used.

The configuration shown in FIG. 4 is but one example approach to integrating fluidic channels into the fabric layer of a wearable device. While fluidic channels 402A and 402B may each form a single warp as shown, in other examples a single fluidic channel may be used to form two or more warps. For example, the single fluidic channel may be arranged in a winding, serpentine manner and woven with fiber warps and wefts to form a fabric layer. When implemented in a glove, a single fluidic channel woven in this manner may extend across different regions of a digit (e.g. distal, middle, and/or proximal phalanges), across different digits, and/or across an entire surface of the glove. In other examples, a fluidic channel may be incorporated into a fabric via knitting or embroidery.

Figure 5:
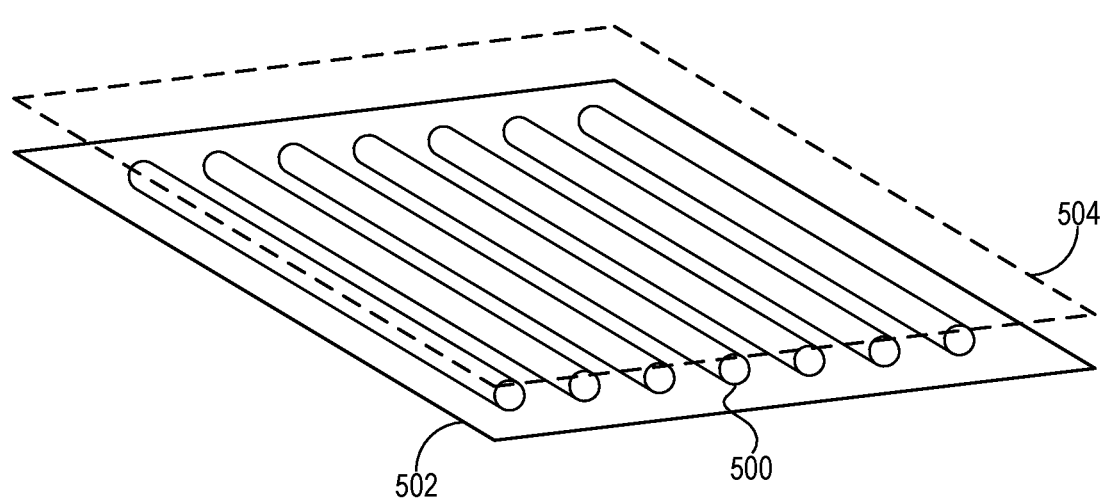
FIG. 5 show fluidic channels interposed between flexible layers of an example wearable device.

In other examples, a fluidic channel may be adhered to a flexible layer, such as a fabric layer or polymer layer, of a wearable device. FIG. 5 shows a plurality of fluidic channels (e.g., fluidic channel 500) interposed between a first flexible layer 502 and second flexible layer 504 of a wearable device. The plurality of fluidic channels 500 are adhered to first flexible layer 502, which may be the layer in contact with a wearer's skin when the wearable device is worn. In other examples, the fluidic channels may be adhered to second flexible layer 504 or both layers. The plurality of fluidic channels 500 may be adhered in any suitable manner, including via chemically curable adhesives (e.g. curable polymers) and lamination via a thermoplastic material.

Figure 6:
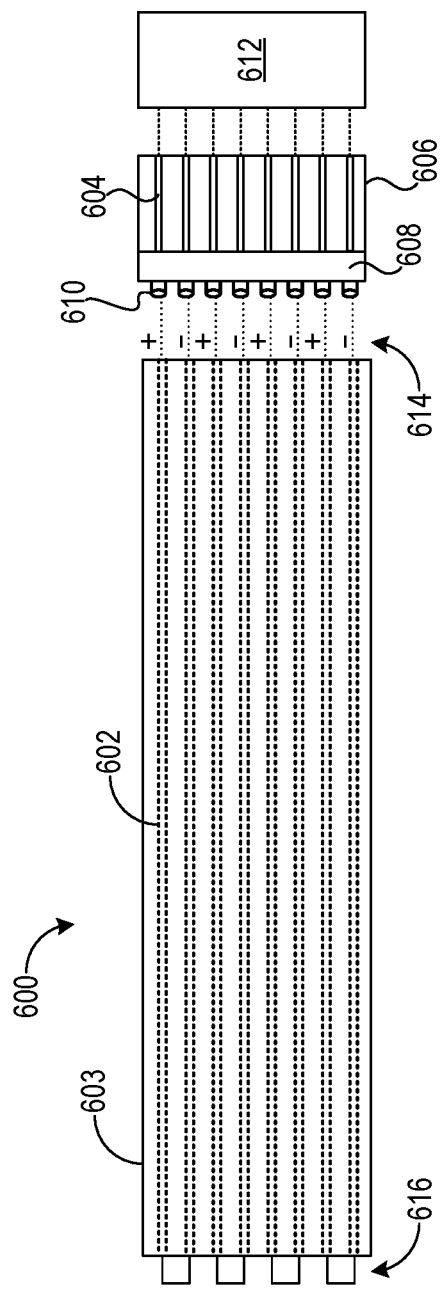
FIG. 6 shows an example flexible circuit element including fluidic channels.

In some examples, a plurality of fluidic channels may be formed in a common fluidic structure. FIG. 6 shows an example flexible circuit element 600 including a plurality of fluidic channels (e.g., fluidic channel 602) formed in a body 603. Flexible circuit element 600 may be formed, for example, by depositing a layer of a silicone polymer (e.g. polydimethylsiloxane) or other suitable flexible polymer, forming channels in the flexible polymer, depositing the electrorheological fluid in the channels, and then encapsulating the channels with another layer of polymer. In some examples, conductive traces (not shown) may be printed with a conductive ink onto a surface of the encapsulating layer in appropriate locations to allow an electric field to be applied to the fluid within each channel.

Instead of printing conductive ink onto the surface of the encapsulating layer, an electrically conductive electrorheological fluid (e.g. a fluid containing a suitable loading of electrically conductive particles) may be used in the channels, thereby allowing an electric field to be applied by running a current through the fluid itself. For example, referring to FIG. 6, each fluidic channel 602 is electrically coupled to a solid conductive circuit shown in the form of a trace 604 provided on a substrate 606 of a connector system 608. The connector system 608 is configured to plug into the fluidic channels via corresponding connectors 610 to interface a solid conductor within the connectors 610 with the electrically conductive electrorheological fluid. Each trace 604 is in turn electrically coupled to a corresponding line from a controller 612.

At a second side 616 opposite to first side 614, adjacent pairs of fluidic channels 602 are electrically coupled. For each pair of electrically coupled fluidic channels 602, a first fluidic channel of the pair is connected to a signal line (+) from controller 612, whereas a second fluidic channel of the pair is connected to a ground line (−). Any suitable circuitry may be used to couple the signal and ground lines, such as a resistor to maintain the voltage difference between the signal and ground lines. Other suitable circuit configurations also may be used.

Figure 7:
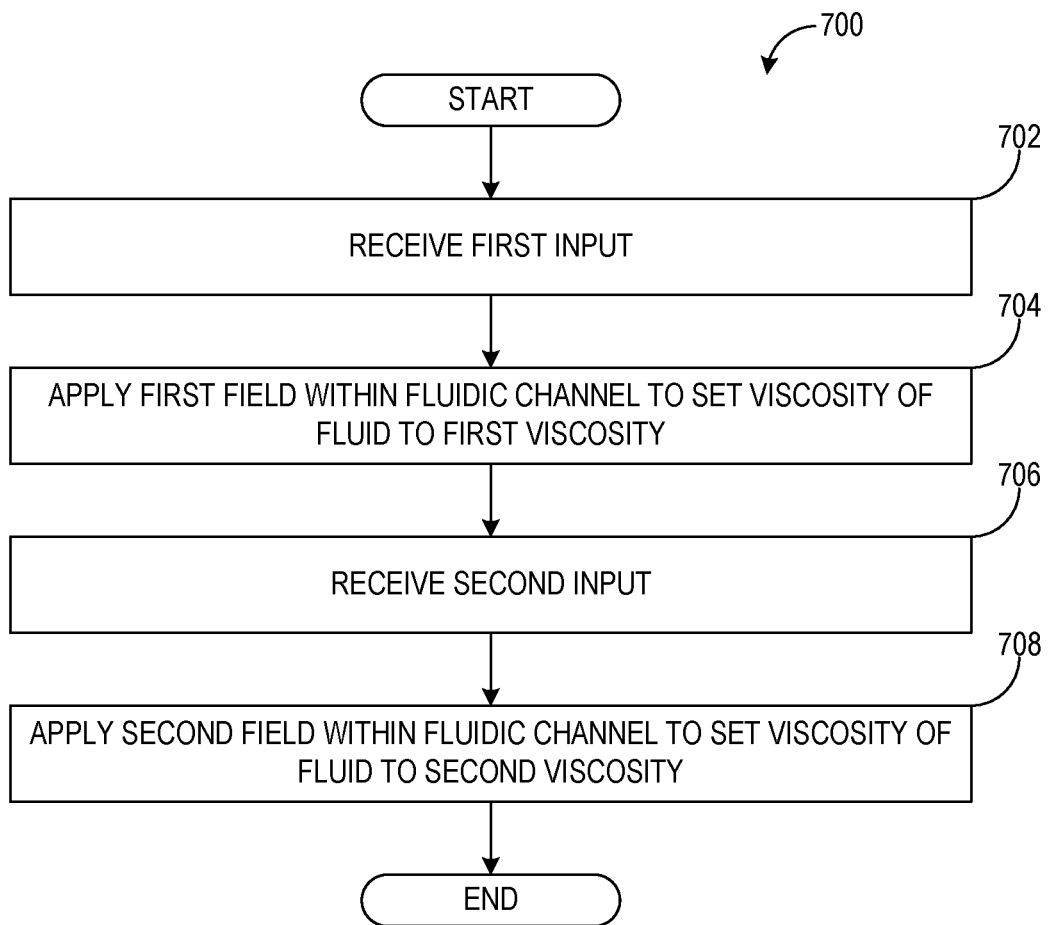
FIG. 7 shows a flowchart illustrating an example method of providing haptic feedback via a wearable electronic device.

Flexible circuit element 600, along with other components shown in FIG. 6, may be implemented in a wearable device in any suitable manner. As examples, flexible circuit element 600 may be interposed between first and second flexible layers of a wearable device FIG. 7 shows a flowchart illustrating a method 700 of providing haptic feedback on a wearable electronic device. Method 700 may be implemented on one or more of the wearable devices described herein, such as glove 200, for example.

At 702, method 700 includes receiving a first input. The first input may be a first user input indicating the intersection of a user hand with a virtual display object, for example. The intersection may be indicated by output from one or more sensors and/or from a host device, for example. Alternatively or additionally, the first input may include output from the one or more sensors and/or other data (e.g., instructions, an electric field for application) from a host device.

At 704, method 700 includes applying a first field within a fluidic channel of the wearable device to set an adjustable viscosity of a fluid disposed in the fluidic channel to a first viscosity, in response to receiving the first input. The first field may be applied via a circuit electrically coupled to one or more conductors with which the first field is established, for example. The first field may be determined based on the first input. For example, the first field may be determined such that, when applied to the fluidic channel, a desired level of mechanical resistance is generated in the wearable device (e.g., to simulate a corresponding opposing force resisting contact with a virtual display object). In some examples, the fluidic channel may be selected from among other fluidic channels in which to apply the field. The first field may be an electric field applied to an electrorheological fluid, or may be a magnetic field applied to a magnetorheological fluid, for example.

At 706, method 700 includes receiving a second input. The second input may be a second user input indicating a change in an interaction state with a virtual display object, for example.

At 708, method 700 includes applying a second field within the fluidic channel of the wearable device to set the adjustable viscosity of the fluid disposed in the fluidic channel to a second viscosity, in response to receiving the second input. For example, the second field, when applied to the fluidic channel, may simulate a reduced resistive force by a virtual display object relative to that simulated with the first field as a result of a relative disengagement (e.g., reduced perceived force applied to the object) of the wearable device with the virtual display object. As another example, the second field may simulate an increased resistive force by a virtual display object relative to that simulated with the first field as a result of an increased engagement (e.g., increased perceived force applied to the object) of the wearable device with the virtual display object. The second field may be an electric field applied to an electrorheological fluid, or may be a magnetic field applied to a magnetorheological fluid, for example.

In some examples, a wearable device having an adjustable viscosity and mechanical resistance may be used in medical, rather than virtual or mixed reality applications. Controllable mechanical resistance may be useful for a patient rehabilitating from a skeletomuscular injury such as back/knee injury, or brain injury such as stroke. In other examples, a wearable device may be used as an active restraint for management of seizures or potentially dangerous body movements associated with autism, psychiatric disorders, or acute substance abuse.

A wearable device having an adjustable viscosity and mechanical resistance may also be amenable to various industrial-safety applications. In one example, machine vision or other environment-sensing componentry may be used to assess whether persons are in close proximity to potentially dangerous machinery. Persons wearing an appropriate wearable device operatively coupled to the environment-sensing componentry may be protected from drawing too close to the machinery, extending a hand or finger into a cutting device, etc. In other examples, a wearable device worn by a worker may be configured for skeletal strain mitigation. When the worker is carrying a heavy object, the wearable device may lock into place, providing additional resistance to motion and relieving stress on the worker's fingers, wrists, arms, legs, and other skeletal joints.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
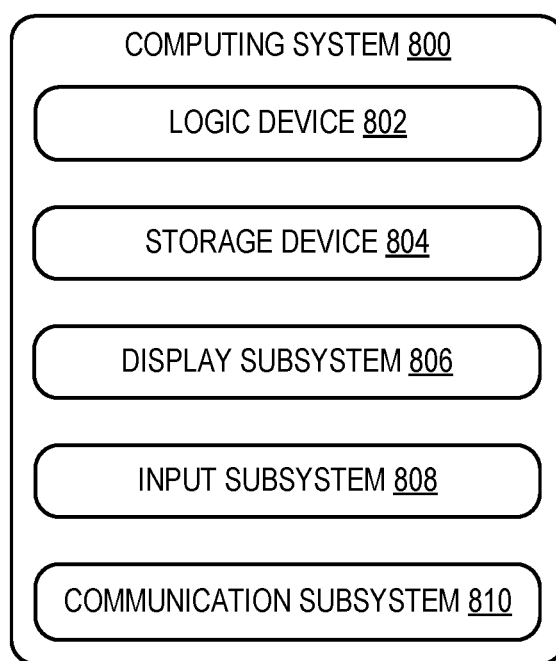
FIG. 8 shows a block diagram of an example computing device.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Another example provides a haptic feedback system comprising a wearable device configured to be worn by a user, the wearable device including a fluidic channel, a fluid disposed within the fluidic channel, the fluid including an adjustable viscosity, a circuit configured to vary a field within the fluidic channel, and a controller configured to receive a first input, and in response to receiving the first input, apply a first field within the channel via the circuit to set the adjustable viscosity of the fluid to a first viscosity, and receive a second input, and in response to receiving the second input, apply a second field within the channel via the circuit to set the adjustable viscosity of the fluid to a second viscosity. In such an example, when set to the first viscosity, the adjustable viscosity of the fluid alternatively or additionally may provide a first mechanical resistance to movement of the wearable device, and when set to the second viscosity, the adjustable viscosity of the fluid alternatively or additionally may provide a second, lesser mechanical resistance to movement of the wearable device. In such an example, the first and second fields alternatively or additionally may be first and second electric fields established via an electrical conductor located outside of the fluidic channel. In such an example, the fluidic channel alternatively or additionally may be woven into a fabric layer of the wearable device. In such an example, the fluidic channel alternatively or additionally may be interposed between a first flexible layer of the wearable device and a second flexible layer of the wearable device. In such an example, the fluidic channel alternatively or additionally may be adhered to one or more of the first flexible layer and the second flexible layer. In such an example, the wearable device alternatively or additionally may include a glove. In such an example, the fluid alternatively or additionally may be an electrorheological fluid. In such an example, the circuit alternatively or additionally may include an electrical conductor extending around the fluidic channel.

Another example provides a haptic feedback system comprising a wearable device configured to be worn by a user, the wearable device including a flexible circuit element comprising a fluidic channel containing an electrically conductive electrorheological fluid, the electrorheological fluid including an electrically adjustable viscosity, and a controller configured to receive a first input, and in response to receiving the first input, apply a first electric field within the fluidic channel to set the adjustable viscosity of the electrorheological fluid to a first viscosity, and receive a second input, and in response to receiving the second input, apply a second electric field within the fluidic channel to thereby set the adjustable viscosity of the electrorheological fluid to a second viscosity. In such an example, the fluidic channel alternatively or additionally may be electrically coupled to a solid conductor. In such an example, the fluidic channel alternatively or additionally may be a first fluidic channel, and the flexible circuit element alternatively or additionally may comprise a second fluidic channel electrically coupled to the first fluidic channel, a first side of the first fluidic channel being connected to a signal line, and a first side of the second fluidic channel being connected to a ground line. In such an example, when set to the first viscosity, the adjustable viscosity of the electrorheological fluid alternatively or additionally may provide a first mechanical resistance to movement of the wearable device, and when set to the second viscosity, the adjustable viscosity of the electrorheological fluid alternatively or additionally may provide a second, lesser mechanical resistance to movement of the wearable device. In such an example, the first and second electric fields alternatively or additionally may be applied internally to the fluidic channel. In such an example, the fluidic channel alternatively or additionally may be interposed between a first flexible layer of the wearable device and a second flexible layer of the wearable device. In such an example, the fluidic channel alternatively or additionally may be adhered to one or more of the first flexible layer and the second flexible layer. In such an example, the wearable device alternatively or additionally may include a glove.

Another example provides, on a wearable electronic device, a method of providing haptic feedback, comprising receiving a first input, in response to receiving the first input, applying a first electric field within a fluidic channel of the wearable device to set an electrically adjustable viscosity of an electrorheological fluid disposed in the fluidic channel to a first viscosity, receiving a second input, and, in response to receiving the second input, applying a second electric field within the fluidic channel to set the electrically adjustable viscosity of the electrorheological fluid to a second viscosity. In such an example, the first and second electric fields alternatively or additionally may be applied externally to the fluidic channel. In such an example, the first and second electric fields alternatively or additionally may be applied internally to the fluidic channel.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A haptic feedback system, comprising:
a wearable device comprising
a fluidic channel arranged at a joint portion of the wearable device, the fluidic channel being woven into a fabric layer of the wearable device;
a fluid disposed within the fluidic channel, the fluid including an adjustable viscosity; and
a circuit comprising a signal line configured to vary a field within the fluidic channel, wherein the signal line is controllable to set the adjustable viscosity of the fluid to a first viscosity by application of a first signal to the signal line to provide a first mechanical resistance to articulation of the fluidic channel at the joint portion, and to set the adjustable viscosity of the fluid to a second, different viscosity by application of a second signal to provide a second, different mechanical resistance to articulation of the fluidic channel at the joint portion.

2. The haptic feedback system of claim 1, wherein the fluidic channel is a first fluidic channel arranged at a first joint portion and the signal line is a first signal line, and further comprising a second fluidic channel arranged at a second joint portion of the wearable device, and a second signal line configured to provide a signal to the second fluidic channel.

3. The haptic feedback system of claim 1, further comprising:
a controller configured to
receive a first input, and in response to receiving the first input, set via the first signal line the adjustable viscosity of the fluid in the first fluidic channel to the first viscosity.

4. The haptic feedback system of claim 1, wherein the fluid comprises an electrorheological fluid.

5. The haptic feedback system of claim 1, wherein the fluid comprises a magnetorheological fluid.

6. The haptic feedback system of claim 1, wherein the wearable device comprises a glove.

7. The haptic feedback system of claim 1, wherein the circuit includes an electrical conductor extending around the fluidic channel.

8. The haptic feedback system of claim 7, further comprising a ground line extending along the fluidic channel.

9. The haptic feedback system of claim 1, wherein the fluidic channel is electrically coupled to a solid conductor.

10. A haptic feedback system, comprising
a wearable device comprising
a fabric layer;
a first fluidic channel arranged at a first joint portion of the wearable device and a second fluidic channel separate from the first fluidic channel, the second fluidic channel arranged at a second joint portion of the wearable device, wherein the first and second fluidic channels are woven into the fabric layer of the wearable device;
a fluid disposed within the first fluidic channel and the second fluidic channel, the fluid including an adjustable viscosity; and
a circuit comprising a first signal line configured to vary a field within the first fluidic channel, and a second signal line configured to vary a field within the second fluidic channel, wherein the first signal line is controllable to set the adjustable viscosity of the fluid in the first channel to a first viscosity by application of a first signal to the first signal line to provide a first mechanical resistance to articulation of the first fluidic channel, and to set the adjustable viscosity of the fluid in the first fluidic channel to a second, different viscosity by application of a second signal to provide a second, different mechanical resistance to articulation of the first fluidic channel at the first joint portion.

11. The haptic feedback system of claim 10, further comprising:
a controller configured to receive a first input, and in response to receiving the first input, vary the field within the first fluidic channel via the first signal line; and
receive a second input, and in response to receiving the second input, vary the field within the second fluidic channel via the second signal line.

12. The haptic feedback system of claim 10, wherein the fluid comprises an electrorheological fluid.

13. The haptic feedback system of claim 10, wherein the first signal line extends around the first fluidic channel, and the second signal line extends around the second fluidic channel.

14. The haptic feedback system of claim 10, wherein the circuit further comprises a ground line extending along the first fluidic channel and the second fluidic channel.

15. The haptic feedback system of claim 10, wherein the wearable device comprises a glove.

16. The haptic feedback system of claim 10, wherein the fluid comprises a magnetorheological fluid.

17. On a wearable electronic device comprising a fabric portion and a fluidic channel woven, knitted, and/or embroidered into the fabric portion, a method of providing haptic feedback, the method comprising:
receiving a first input;
in response to receiving the first input, applying a first electric field within the fluidic channel via a signal line to set a viscosity of an electrorheological fluid disposed in the fluidic channel to a first viscosity and thereby provide a first mechanical resistance to motion;
receiving a second input; and
in response to receiving the second input, applying a second electric field within the fluidic channel via the signal line to set the viscosity of the electrorheological fluid to a second viscosity and thereby provide a second mechanical resistance to motion.

18. The method of claim 17, wherein the first electric field and the second electric field are applied externally to the fluidic channel.

19. The method of claim 17, wherein the first electric field and the second electric fields are applied internally to the fluidic channel.

20. The method of claim 17, wherein the fluidic channel is a first fluidic channel, wherein the signal line is a first signal line, wherein the wearable electronic device comprises a second fluidic channel woven into the fabric portion and a second signal line, and wherein the method further comprises separately controlling the viscosity of the fluid disposed in the first fluidic channel via the first signal line and a viscosity of a fluid disposed in the second fluidic channel via the second signal line.

* * * * *